Dec. 29, 1970   R. C. COLLYER   3,550,217
FASTENER
Filed July 8, 1968

INVENTOR
Robert Charles Collyer
by Philip E. Parker
Attorney.

United States Patent Office 3,550,217
Patented Dec. 29, 1970

1

3,550,217
FASTENER
Robert C. Collyer, Harefield, England, assignor to United-Carr Incorporated, Boston, Mass., a corporation of Delaware
Filed July 8, 1968, Ser. No. 743,129
Claims priority, application Great Britain, July 19, 1967, 33,099/67
Int. Cl. F16b 19/00
U.S. Cl. 24—73                                           6 Claims

ABSTRACT OF THE DISCLOSURE

The invention relates to a synthetic plastics fastener for attachment to an apertured workpiece and comprises a head for abutment against the outer surface of the workpiece and a shank for snap-engagement through the aperture. The shank comprises a central lengthwise extending member and two lengthwise extending flanges which are joined to opposite sides of the central member by flexible webs which act as hinges rendering the flanges collapsible in a radial sense, the flanges terminating short of the head thereby increasing the range of hinging movement of the upper ends of the flanges.

BACKGROUND OF THE INVENTION

Synthetic plastics fasteners comprising a head and a shank which is snap-engageable into an aperture in a workpiece are well known but the major problem in designing this type of fastener lies in providing a shank which is sufficiently flexible to be usable over a range of aperture sizes, to allow for manufacturing tolerances, and at the same time will provide a secure hold when in place. In order to meet this problem it has been suggested in U.S. Pat. No. 3,181,411 to form the shank of the fastener with a lengthwise extending U-shaped central member and two lengthwise extending flanges joined to the arms of the U-shaped members by flexible webs which enable the flanges and the central member to collapse in a concertina fashion. In this known fastener the flanges are joined, at the tip of the shank, to a solid nose and at the other end of the shank, to the head. Thus, the length of the flanges is relatively small, their flexibility is minimal and the fastener can only be used effectively in an aperture of exact dimensions. Very little tolerance can be given with this known fastener for manufacturing errors in the aperture size and it is an object of the present invention to provide a fastener which has all the advantages of the known fastener and in addition has much greater flexibility thereby increasing its useful range of application.

STATEMENT OF THE INVENTION

According to the invention there is provided a fastener comprising a head and a shank projecting from the undersurface of the head, the shank comprising a central member which extends lengthwise of the shank and which is joined to the head and two lengthwise extending flanges which are joined to opposite sides of the central member by flexible webs, wherein the flexible webs act as hinges for the flanges and the webs and the flanges stop short of the head of the fastener thereby rendering portions of the flanges adjacent the head freely movable under the hinging action of the webs.

2

Figure 1:
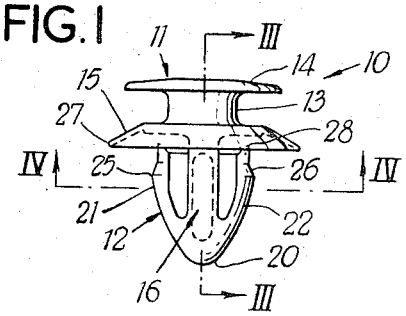
FIG. 1 is an elevation of a fastener according to the present invention.
Figure 2:
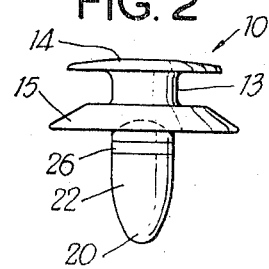
FIG. 2 is a side elevation of FIG. 1.
Figure 3:
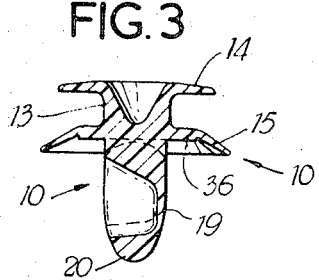
FIG. 3 is a section on the line III—III of FIG. 1.
Figure 4:
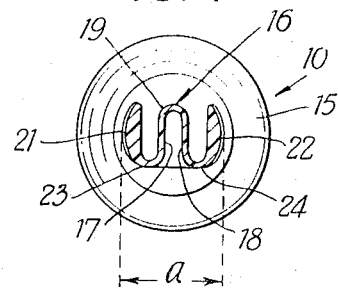
FIG. 4 is a section on the line IV—IV of FIG. 1.
Figure 5:
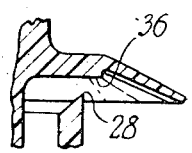
Figure 6:
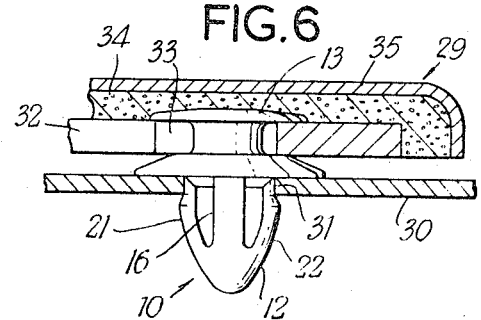
Figure 7:
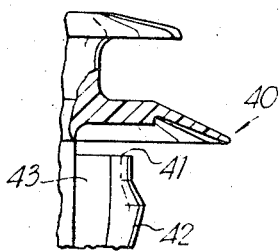
Figure 8:
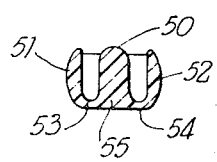
Figure 9:
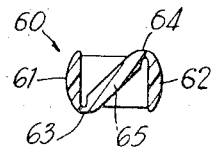

FIG. 5 is a section through a detail of FIG. 1 on an enlarged scale,
FIG. 6 is an elevation, partly in section of a trim pad attached to an apertured panel with the aid of the fastener of FIG. 1,
FIG. 7 is an elevation, partly in section, of a modification of the fastener of FIG. 1,
FIG. 8 is a transverse section through the shank of a further modification of the fastener of FIG. 1, and
FIG. 9 is a transverse section through the shank of yet a further modification of the fastener of FIG. 1.

DESCRIPTION OF THE PREFERRED EMBODIMENTS

In FIGS. 1 to 5 a synthetic plastics fastener is indicated generally at 10. The fastener 10 is preferably injection moulded, in a well-known manner and comprises a head, which is indicated generally at 11 and a shank, which is indicated generally at 12.

The head 11 comprises a cylindrical portion 13, an outer, circular flange 14 and a flexible frusto-conical skirt 15 which surrounds the portion of the shank adjacent the head. The head 11 is adapted for engagement in a keyhole slot in a trim pad in a manner explained in detail below, but it is to be understood that the shape of the head is not an essential feature of the invention and it can be adapted to serve any desired purpose, for instance it can be adapted to engage a cable or a moulding.

The shank 12 comprises a lengthwise extending central member 16 which is U-shaped on any transverse section through the shank and which is formed by two arms 17 and 18 joined by a flexible central web 19. The central member 16 terminates in a solid tapered nose 20 and two flanges 21 and 22 are joined to the arms 17 and 18, at the open mouth of the U, by flexible outer webs 23 and 24, respectively.

The flanges 21 and 22 stop short of the head 11 and their outer surfaces taper into the nose to give the shank a smooth uninterrupted lead-in to an aperture. The outer surfaces of the flanges 21 and 22 are convexly curved and each flange is formed with a sloping shoulder 25 and 26, respectively and with a tip 27 and 28, respectively which is tapered towards the head and which projects into the frusto-conical skirt 15.

The maximum transverse dimension $a$ of the shank, in the region above the shoulders, is slightly greater than the diameter of the aperture into which the fastener is to be attached. As the fastener is inserted into the aperture, the shank is collapsed, in a concertina fashion, along the line $a$, with the open mouth of the U-shaped central member 16 collapsing on one side of the shank and the flanges 21 and 22 hinging inwardly about the flexible outer webs 23 and 24 on the other side of the shank. Because the flanges are not joined to the head, the upper corners 21a and 22a of the flanges have a substantial range of movement as the shank is compressed thereby enabling the shank to engage securely in a wide range of aperture sizes.

Preferably, the radius of curvature of the outer surface of each flange 21 and 22, at least in the region between the shoulder and the tip, is approximately equal to the radius of the aperture so that, when in place, the flanges fit snugly against the rim of the aperture.

The fastener 10 can be used, as shown in FIG. 6, to attach a trim pad 29 to a support panel 30 formed with a circular aperture 31. The trim pad 29 comprises a fibre board panel 32, which is formed with a keyhole slot 33 and is backed with a padding material 34 and an outer skin 35.

In order to attach the fastener 10 to the trim pad 29 the outer flange 14 of the head of the fastener is inserted through an enlarged portion of the slot 33 until the skirt 15 abuts the fibre board panel 32. The fastener 10 is then slid along the keyhole slot 33 into a narrower portion where it is retained by the flange 14.

The trim pad 29 is then presented to the support panel 30 and the shank 12 is forced into the aperture 31 thereby collapsing the shank in the manner described above. The shank is forced through the aperture until the sloping shoulders 25 and 26 are located behind the panel and the skirt is flattened against the front of the panel to seal the aperture. An annular abutment 36 is provided on the head 11 to prevent over flattening of the skirt as the shank is driven home.

When the fastener is assembled in the panel the shank is under compression, the shoulders 25, 26 of the flanges 21, 22 are engaged behind the panel and the tips 27 and 28 of the two flanges are located as a snug fit against the rim of the aperture.

If at any time it becomes necessary to remove the fastener from the support panel 30 this can be done quickly and easily with the sloping shoulders 25, 26 acting as camming surfaces against the rim of the aperture causing the shank to collapse smoothly as it is withdrawn.

As can be seen clearly from FIG. 5, the tip of each flange projects above the adjacent web which joins the flange to the central member, but this is not essential. As shown in FIG. 7, in a modification 40 of the fastener 10 the upper edge 41 of each flange 42 can be straight and flush with the upper edge of the adjacent web 43.

The central member 16 of the shank of the fastener 10 is not essentially U-shaped and can be solid as shown at 50 in FIG. 8, with flanges 51 and 52 joined, by flexible webs 53 and 54, to the same end 55 of the central member. Alternatively, and as shown at 60 in FIG. 9 flanges 61 and 62 can be joined by webs 63 and 64 respectively to opposite ends of the central solid member 65.

What I claim is:

1. A fastener comprising a head and a shank projecting from the undersurface of the head, the shank comprising a central member which extends lengthwise of the shank and which is joined to the head and two lengthwise extending flanges which are joined to opposite sides of the central member by flexible webs, wherein the flexible webs act as hinges for the flanges and the webs and the flanges stop short of the head of the fastener thereby rendering portions of the flanges adjacent the head freely movable under the hinging action of the webs.

2. A fastener as claimed in claim 1, wherein the central member is U-shaped on any transverse section therethrough and the webs of material are joined to the longitudinal edges of the U-shaped central member.

3. A fastener as claimed in claim 2, wherein the outer surface of each flange is convexly curved.

4. A fastener as claimed in claim 3, wherein the ends of the flanges which face the undersurface of the head are tapered towards the head.

5. A fastener as claimed in claim 4, wherein the outer surface of each flange is formed with a retaining shoulder which faces the undersurface of the head.

6. A fastener as claimed in claim 5, wherein the head includes a flexible skirt which surrounds the portion of the shank adjacent the head.

References Cited

UNITED STATES PATENTS

| | | | |
|---|---|---|---|
| 3,093,874 | 6/1963 | Rapata | 24—73HSMF |
| 3,181,411 | 5/1965 | Mejlso | 85—5 |
| 3,203,304 | 8/1965 | Rapata | 24—73HSMFX |
| 3,393,431 | 7/1968 | Saunders | 24—73PF |

FOREIGN PATENTS

| | | | |
|---|---|---|---|
| 1,060,079 | 2/1967 | Great Britain | 24—73HSMF |

DONALD A. GRIFFIN, Primary Examiner

U.S. Cl. X.R.

52—717; 85—5